(12) United States Patent
Fossen, Jr.

(10) Patent No.: US 10,640,165 B2
(45) Date of Patent: May 5, 2020

(54) MOTORCYCLE SOFT LOWER SYSTEM

(71) Applicant: Ronald D. Fossen, Jr., Lander, WY (US)

(72) Inventor: Ronald D. Fossen, Jr., Lander, WY (US)

(*) Notice: Subject to any disclaimer, the term of this patent is extended or adjusted under 35 U.S.C. 154(b) by 94 days.

(21) Appl. No.: 15/940,467

(22) Filed: Mar. 29, 2018

(65) Prior Publication Data

US 2018/0215431 A1    Aug. 2, 2018

Related U.S. Application Data

(63) Continuation-in-part of application No. 15/620,609, filed on Jun. 12, 2017, now abandoned.

(60) Provisional application No. 62/349,570, filed on Jun. 13, 2016.

(51) Int. Cl.
*B62J 17/06* (2006.01)
*B62J 27/00* (2020.01)

(52) U.S. Cl.
CPC .............. *B62J 17/06* (2013.01); *B62J 27/00* (2013.01)

(58) Field of Classification Search
CPC ... B62J 17/02; B62J 17/06; B62J 17/04; B62J 17/065; B62J 23/00; B62J 27/00; B62J 6/02; B62J 2099/0086
USPC .......... 296/78.1, 180.1, 136.02, 81, 82, 192; 362/459, 473, 317, 343, 355, 84
See application file for complete search history.

(56) References Cited

U.S. PATENT DOCUMENTS

| | | | |
|---|---|---|---|
| 557,488 A | 3/1896 | Cherry | |
| 3,058,636 A | 10/1962 | Bilbeisi | |
| 3,264,082 A | 8/1966 | Golightly | |
| 4,130,315 A | 12/1978 | Shields | |
| 4,136,890 A | 1/1979 | Vertucci | |
| 4,331,344 A | 5/1982 | Vetter | |
| 4,457,552 A | 7/1984 | Katsuoka | |
| 4,655,497 A | 4/1987 | Mallett | |
| 5,018,564 A * | 5/1991 | Anglin | B62J 13/04 150/167 |
| 5,458,945 A | 10/1995 | Tall | |
| 6,042,171 A | 3/2000 | Hesse | |
| D438,496 S | 3/2001 | Guertin | |
| 6,231,104 B1 | 5/2001 | Roethel | |
| 6,923,489 B2 * | 8/2005 | Keys | B62J 17/02 296/136.07 |
| 7,178,858 B1 | 2/2007 | Hesse | |
| 7,556,292 B2 * | 7/2009 | King | B62J 17/06 150/167 |
| 7,753,430 B1 | 7/2010 | Elgin | |

(Continued)

OTHER PUBLICATIONS

AirLite. Engine Guard Chaps. https://www.airlite.ca/.
(Continued)

*Primary Examiner* — D Glenn Dayoan
*Assistant Examiner* — Sunsurraye Westbrook (57) ABSTRACT

A motorcycle soft cover system is described herein. The system has a screen lower that attaches to a motorcycle highway bar via hook and loop attachment components, thereby substantially covering an interior space of the highway bar. The screen lower can have a window disposed thereon. A solid lower can be removably attached to the screen lower. The solid lower can have a window that is similar in shape and size to the window of the screen lower. The window of the solid lower can be aligned with the window of the screen lower.

7 Claims, 8 Drawing Sheets

(56) References Cited

U.S. PATENT DOCUMENTS

| | | | |
|---|---|---|---|
| 8,047,597 B2 * | 11/2011 | Nakamura | B62J 17/06 296/78.1 |
| 8,424,949 B2 | 4/2013 | Ransone | |
| 9,211,292 B2 | 12/2015 | Howard et al. | |
| 9,211,929 B1 | 12/2015 | Holeman | |
| 2004/0051336 A1 * | 3/2004 | Chiao | B62J 17/065 296/78.1 |
| 2010/0096877 A1 | 4/2010 | Vinson | |
| 2011/0317441 A1 | 12/2011 | Yasuhara et al. | |
| 2014/0048347 A1 | 2/2014 | Munzel et al. | |

OTHER PUBLICATIONS

Desert Dawgs Rain Guards. https://www.leadermotorcycle.com/pages/desert-dawgs-rain-guards.
Desert Digits Wind Deflectors. http://www.motoleather.com/desert-digits-wind-deflectors-for-all-engine-guards.html.
Soft Lowers. http://www.eglidegoodies.com/id63.html.

* cited by examiner

MOTORCYCLE SOFT LOWER SYSTEM

CROSS REFERENCE

This application claims priority to and is a continuation-in-part of U.S. Non-Provisional Application No. 15/620,609 filed Jun. 12, 2017, which claims priority to U.S. Provisional Patent Application 62/349,570, filed Jun. 13, 2016, the specification(s) of which is/are incorporated herein in their entirety by reference.

FIELD OF THE INVENTION

The present invention relates to motorcycle soft lower systems, in particular, to a two-stage soft lower system having a screen layer and a solid layer.

BACKGROUND OF THE INVENTION

When operating a motorcycle, riders are subjected to wind pressure on their lower legs. Furthermore, the riders are often struck on their legs by bugs and other small debris that can enter and damage a motorcycle's engine. In inclement weather, this problem may be further exacerbated by water, snow, or other debris (e.g. those made airborne by wind). Therefore, there exists a need to provide motorcycle riders with a more comfortable riding experience with an additional benefit of potentially protecting a motorcycle engine from debris.

Motorcycle highway bars, which may also be referred to as engine guard bars or crash bars, are hoop-shaped bars, typically oval or rectangular, that are mounted onto the motorcycle frame. The highway bars are positioned between the front tire and the engine, and extend past the width of motorcycle. In some types of accidents, the highway bars can protect the rider by preventing the motorcycle from lying flat on its side, thus keeping the bike from entrapping the rider's body. Motorcycle highway bars may also minimize damage to the bike by protecting the motorcycle engine and body. Soft lowers are a type of motorcycle accessory cover that can be installed onto a motorcycle's existing highway bar.

The present invention features a novel soft lower system comprising a screen layer and a solid layer. As used herein, the term "screen layer" may be used interchangeably with "screen lower", and the term "solid layer" may be used interchangeably with the terms "solid lower" and "storm lower".

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a two-stage soft lower system that may be used in a wide range of riding conditions to protect a motorcycle engine and the rider's lower legs from wind, bugs, and debris, as well as the cold and rain. In some aspects, the present invention features a motorcycle soft lower system that can be attached to an existing motorcycle highway bar. In one embodiment, the system may comprise the motorcycle highway bar, a screen lower having a size and shape that substantially covers an interior space of the motorcycle highway bar, a first window centrally disposed on the screen lower, and a plurality of screen attachment components attached to and extending from a perimeter of the screen lower. The screen attachment components can attach the screen lower to the motorcycle highway bar. In some aspects, each screen attachment component may comprise a loop material tab and a hook material tab. The loop material tab is configured to wrap around the highway bar such that the loop material faces outwardly, and the hook material tab is configured to wrap around the highway bar such that the hook material faces towards the loop material. At least a portion of the hook material can overlap and secure to at least a portion of the loop material, thereby securing the screen lower to the highway bar.

In other aspects, the system may further comprise a solid lower having substantially the same shape as the screen lower and sufficiently sized to cover the screen lower. A plurality of hook material segments may be disposed at or near a perimeter of the solid lower. The solid lower may be secured to the screen lower by attaching said hook material segments to the remaining exposed loop material of the screen lower's loop material tabs. The solid lower may also have a window that is substantially the same shape as the first window of the screen lower. Preferably, the window may be disposed on the solid lower so as to be in alignment with the first window.

In preferred embodiments, the screen lower can reduce air flow over a rider's lower legs. The screen lower can be use on all types of roads and during most weather conditions. In other preferred embodiments, the solid lower may be used during cooler temperatures and for deflecting rain from a rider's lower legs. The windows of the screen lower and solid lower can allow for air flow to the engine to reduce overheating. Without wishing to limit the present invention to any particular theory or mechanism, the present invention has the advantage of being comfortably used in warm weather, while being adaptable for cold weather use as well. None of the presently known prior references or work has the unique inventive technical feature of the present invention.

BRIEF DESCRIPTION OF THE DRAWINGS

The features and advantages of the present invention will become apparent from a consideration of the following detailed description presented in connection with the accompanying drawings in which.

DESCRIPTION OF PREFERRED EMBODIMENTS

Figure 1A:
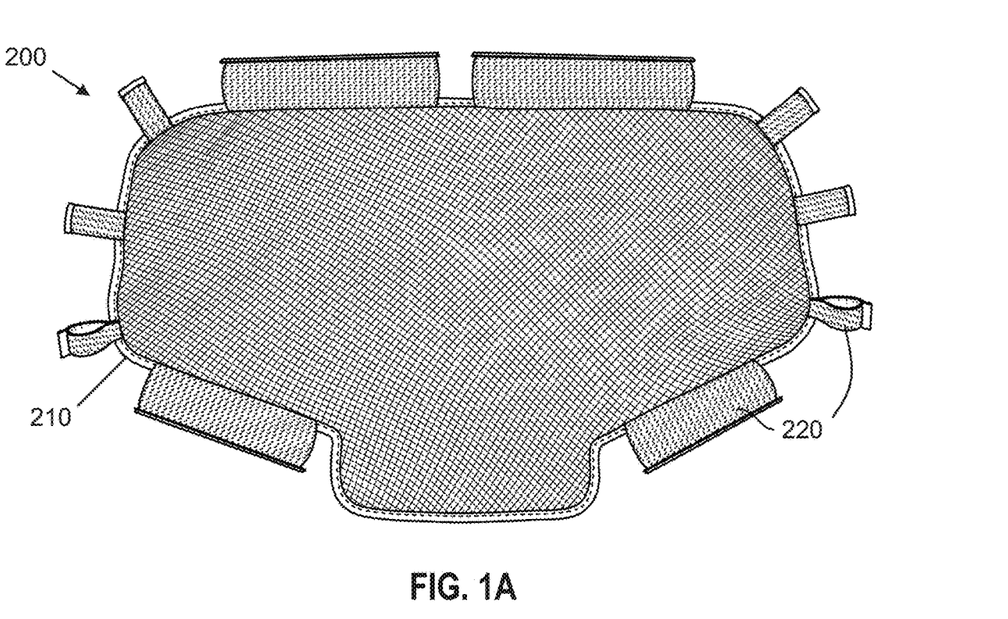
FIG. 1A shows a front view of a screen lower of a soft lower system of the present invention.
Figure 1B:
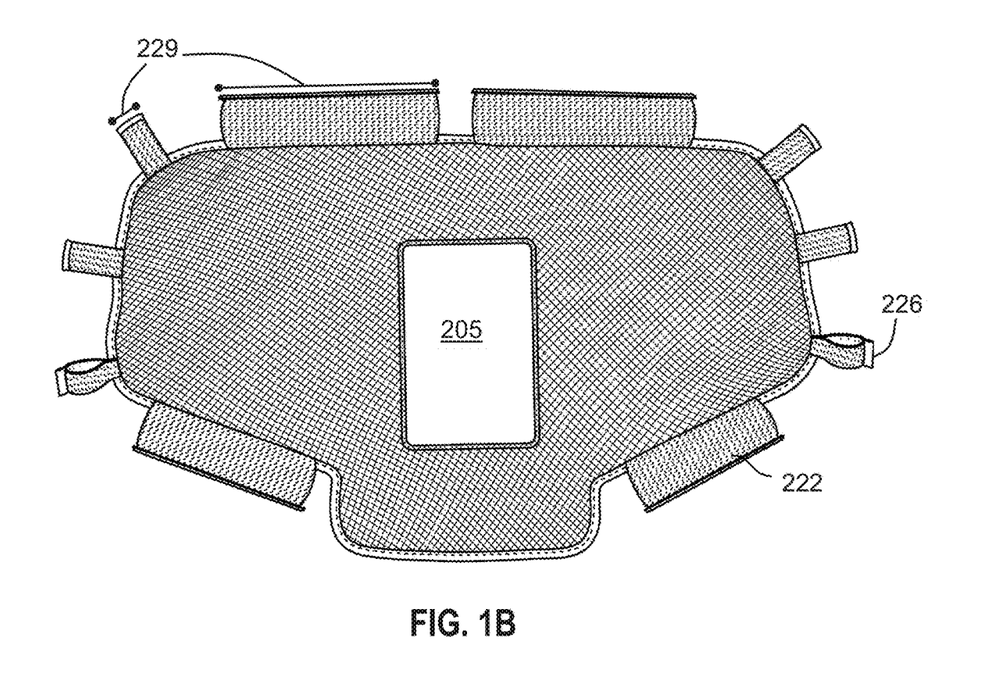
FIG. 1B shows a front view of an alternative embodiment of the screen lower having a central opening disposed therein.
Figure 1C:
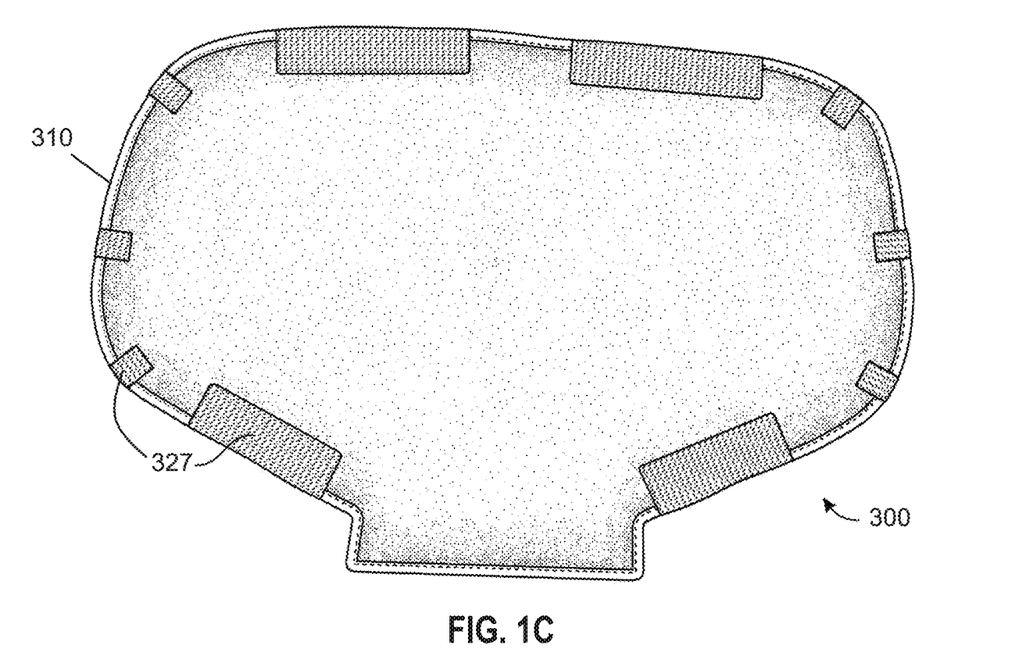
FIG. 1C shows a back view of a storm lower of the soft lower system.
Figure 2:
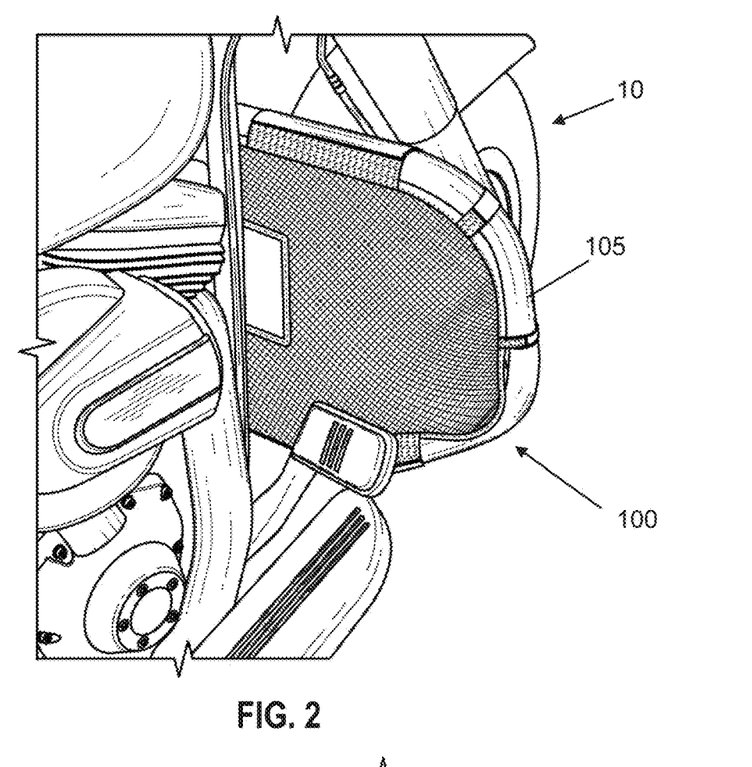
FIG. 2 shows a rear perspective view of an embodiment of the screen lower attached to a motorcycle highway bar.
Figure 3:
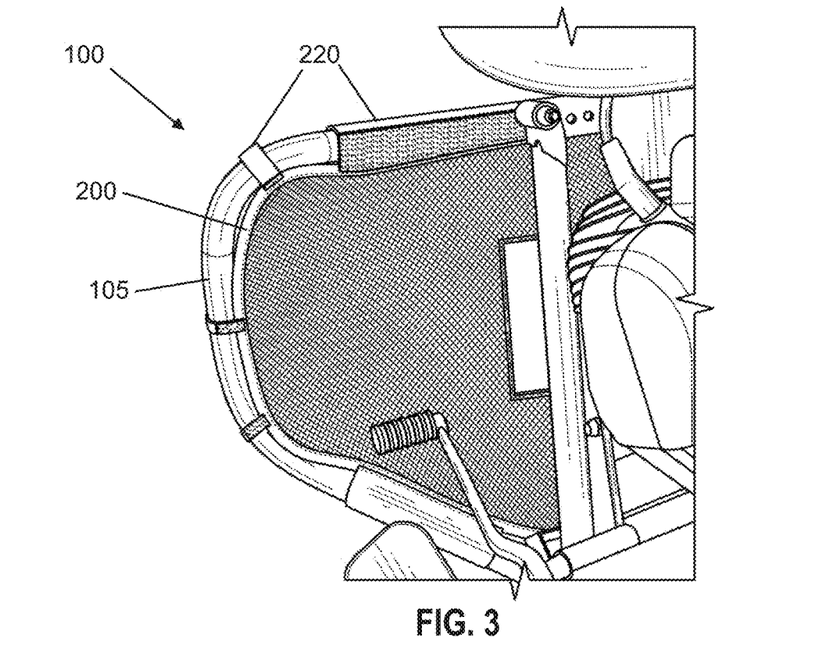
FIG. 3 shows another rear perspective view of the screen lower attached to the motorcycle highway bar.
Figure 4:
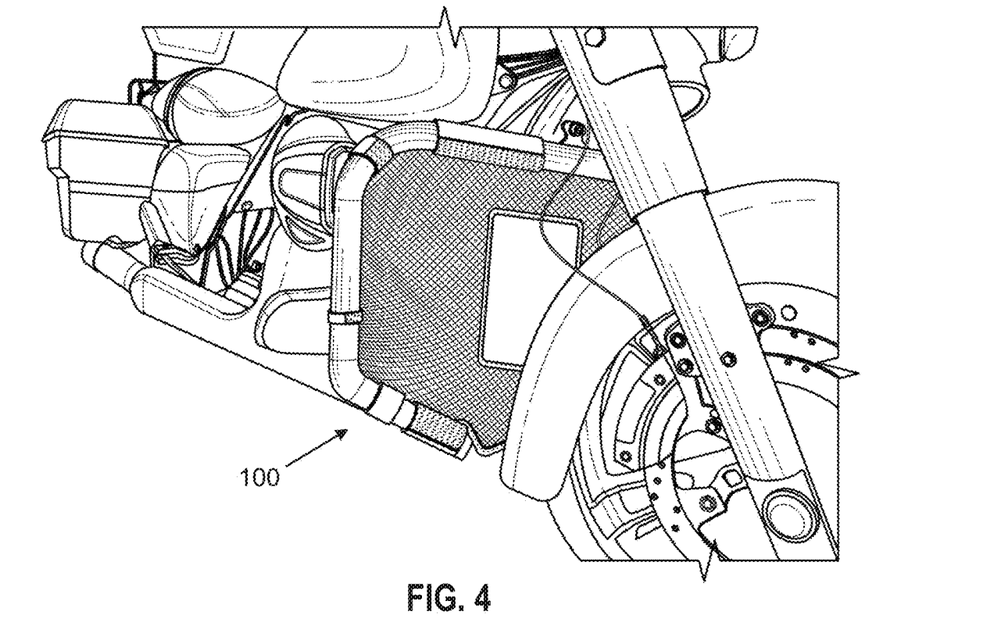
FIG. 4 shows a front perspective view of the screen lower attached to the motorcycle highway bar.
Figure 7:
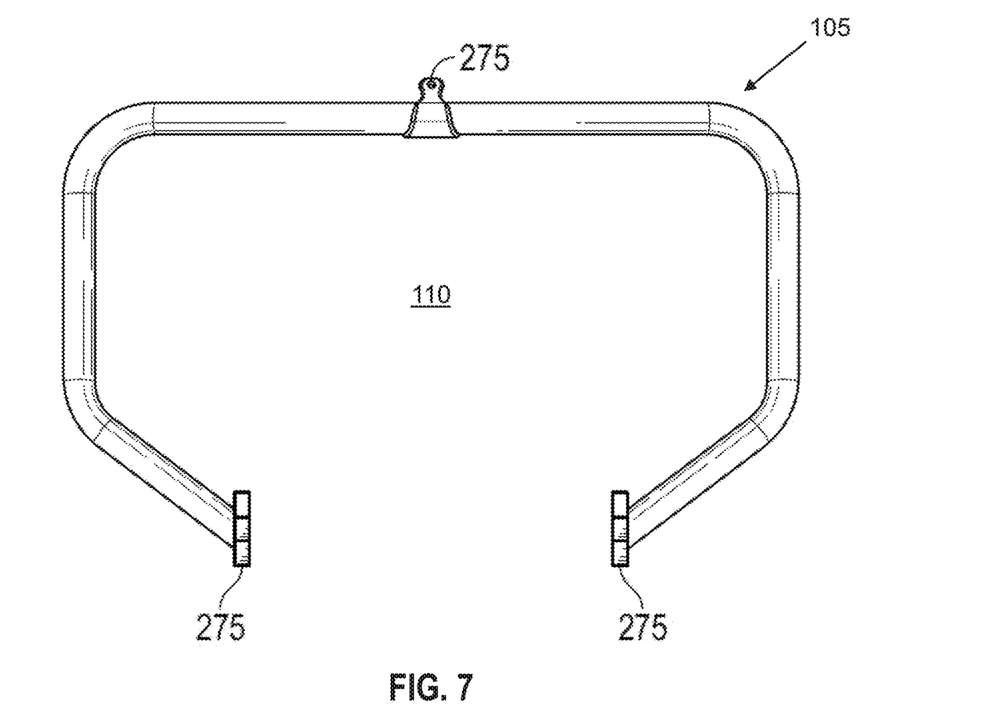
FIG. 7 shows a non-limiting embodiment of a motorcycle highway bar.

Following is a list of elements corresponding to a particular element referred to herein:
- 10 motorcycle
- 100 motorcycle soft lower system
- 105 motorcycle highway bar
- 110 interior space of the motorcycle highway bar
- 200 screen lower
- 205 first window
- 210 perimeter of the screen lower
- 220 screen attachment components
- 222 loop material tab
- 223 loop material
- 224 length of the loop material tab
- 226 hook material tab
- 227 hook material
- 228 length of the hook material tab
- 229 width of screen attachment components
- 275 motorcycle highway bar attachment member points
- 300 solid lower or storm lower
- 305 second window
- 305-a second window with screen material
- 310 perimeter of the solid lower
- 327 hook material segments Referring now to FIGS. 1A-1B, in one embodiment, the present invention features a motorcycle soft lower system (100). The system may be attached to a motorcycle highway bar (105), which is attached to a motorcycle frame such that the highway bar (105) is disposed between an engine and a front tire of a motorcycle. Motorcycle highway bar attachment member points (275) may be used in conjunction with fasteners to attach the highway bar (105) to the motorcycle frame. In some embodiments, the system may comprise a screen lower (200) having a size and shape that substantially covers an interior space (110) of the motorcycle highway bar, and a plurality of screen attachment components (220) attached to and extending from a perimeter (210) of the screen lower. As shown in FIG. 7, the interior space of the motorcycle highway bar is the region formed and bounded, in most parts, by the motorcycle highway bar. For example, this interior space can have a general shape of an oval, rectangle, or polygon. Thus, as shown in FIGS. 2-4, the screen lower is shaped and sized to be substantially the same as the interior space of the motorcycle highway bar. As used herein, the term "substantially" refers to being similar or identical, i.e. about 90% to 100%, to the referenced component.

Figures 8A, 8B:
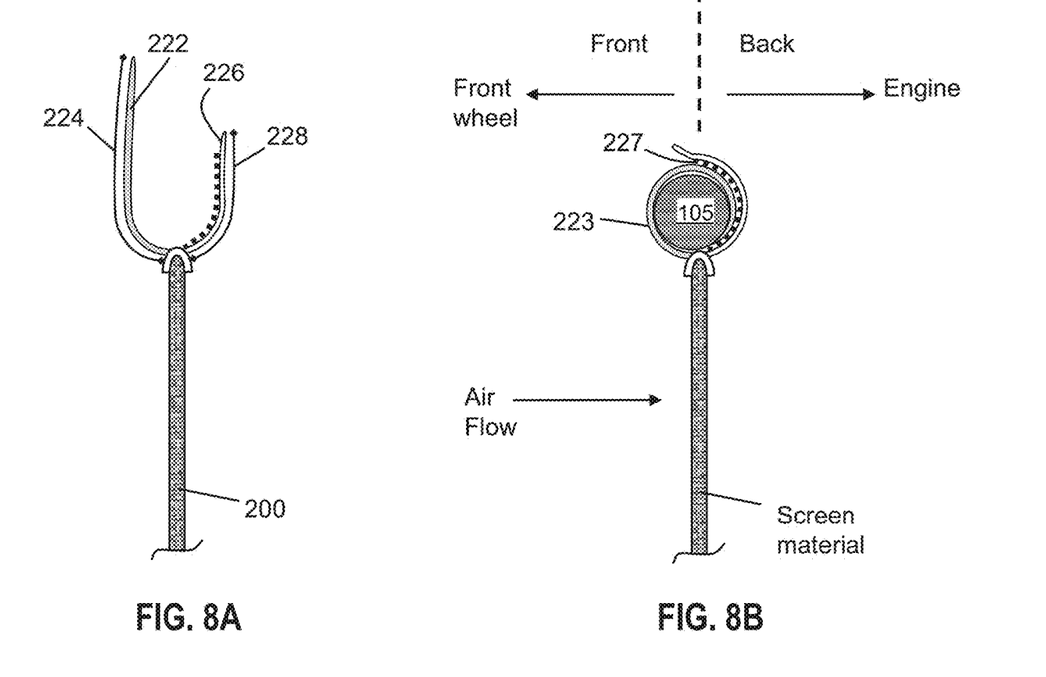
FIG. 8A is a side view of an attachment component of the screen lower.
FIG. 8B is a side view of the attachment component of the screen lower attaching to the motorcycle highway bar.

In some embodiments, the screen attachment components (220) are configured to attach the screen lower (200) to the motorcycle highway bar (105). As shown in FIG. 8A, each screen attachment component (220) may comprise a loop material tab (222) and a hook material tab (226). Both tabs may be parallel to each other, and attached to the perimeter of the screen lower. In one embodiment, the tabs are stitched to the screen lower. In some embodiments, a loop material (223) of the loop material tab faces away from the hook material tab (226), and a hook material (227) of the hook material tab faces towards the loop material tab (222). For installation purposes, the loop material tab (222) is configured to wrap around the highway bar (105) such that the loop material (223) faces outwardly. The hook material tab (226) is then configured to wrap around the highway bar (105) such that the hook material (227) faces towards the loop material (223). In this configuration, the hook material can attach to the loop material.

In some embodiments, a length (228) of the hook material tab, defined as the length from the perimeter of the screen lower to an outer edge of the hook material tab, may be about 25% to about 75% of a circumference of the highway bar. In other embodiments, a length (224) of the loop material tab, defined as the length from the perimeter of the screen lower to an outer edge of the loop material tab, may be at least 25% longer than the length (228) of the hook material tab. Preferably, at least a portion of the hook material (227) can overlap at least a portion of the loop material (223) when the loop material tab (222) is wrapped around the highway bar, thereby securing the screen lower (200) to the highway bar (105). For instance, as shown in FIG. 8A, the length (228) of the hook material tab may be about 50% of the circumference of the highway bar, and the length (224) of the loop material tab is about twice the length (228) of the hook material tab. In some embodiments, the length (224) of the loop material tab may range from about 3 to 6 inches. In other embodiments, the length (228) of the hook material tab may range from about 1 to 3 inches.

In one embodiment, the screen attachment components (220) may have equal widths (229). In another embodiment, the screen attachment components (220) may have varying widths (229). For example, as shown in FIG. 1A, the top and bottom screen attachment components (220) may have the same widths, whereas the side and corner components may have shorter widths. In some embodiments, the number of screen attachment components (220) may range from about 4 to about 14 screen attachment components (220). Again referring to FIG. 1A, the screen lower may have ten screen attachment components, of which four are top and bottom components having longer widths, and the remaining six are side and corner components having shorter widths.

Figure 5:
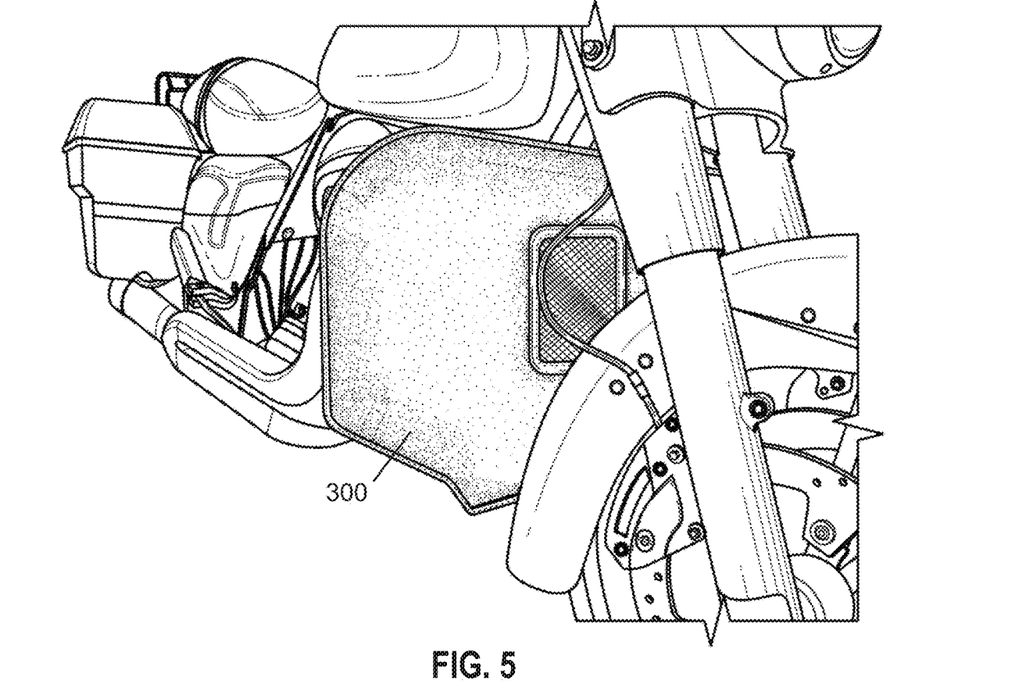
FIG. 5 shows a front perspective view of an embodiment of the storm lower attached to the screen lower, which is attached to the motorcycle highway bar.
Figure 6:
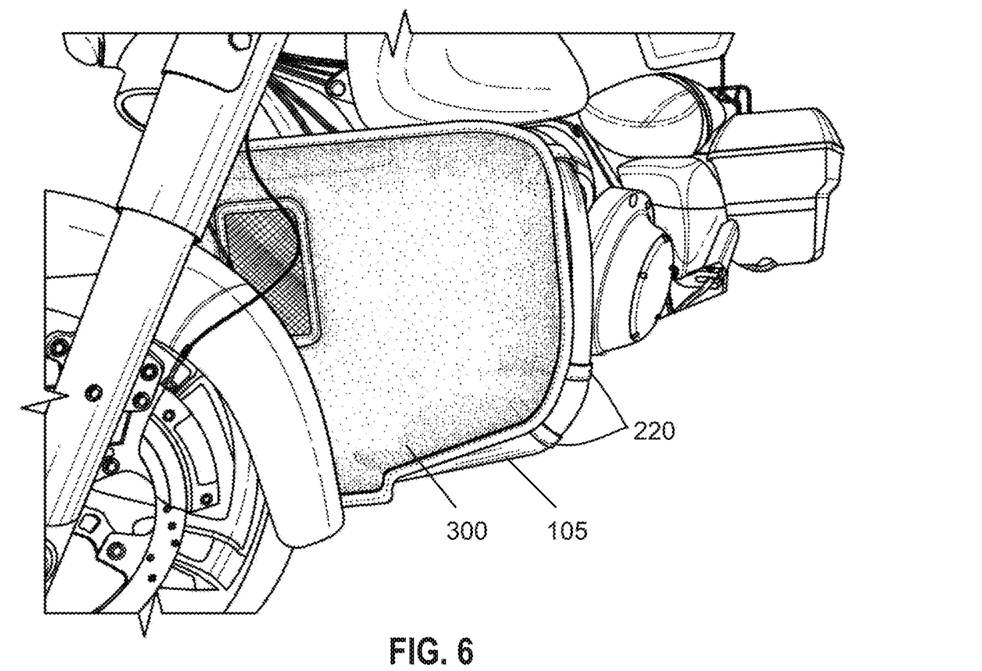
FIG. 6 shows another front perspective view of the storm lower attached to the screen lower, which is attached to the motorcycle highway bar.

According to other embodiments, the system (100) may further comprise a solid lower (300) having substantially the same shape as the screen lower (200). The solid lower (300) may be sufficiently sized to cover the screen lower (200). Referring to FIGS. 5 and 6, in some embodiments, the solid lower (300) may be sized so as to further overlap with the highway bar (105). As shown in FIG. 10, the solid lower may have a plurality of hook material segments (327) disposed at or near a perimeter (310) of the solid lower. In preferred embodiments, the solid lower (300) is configured to be secured to the screen lower (200) by attaching said hook material segments (327) to the remaining exposed loop material (223) of the loop material tabs.

In one embodiment, the number of hook material segments (327) is equal to the number of screen attachment components (220). In another embodiment, the hook material segments (327) may be positioned at or near the perimeter (310) of the solid lower such that the segments (327) are aligned with the screen attachment components (220). In some embodiment, the segments (327) may be stitched to the solid lower. Without wishing to limit the invention to a particular configuration, the hook material of the solid lower attaches to the loop material of the screen lower at matching locations, thereby aligning the solid lower and the screen lower when used together.

Figure 8C:
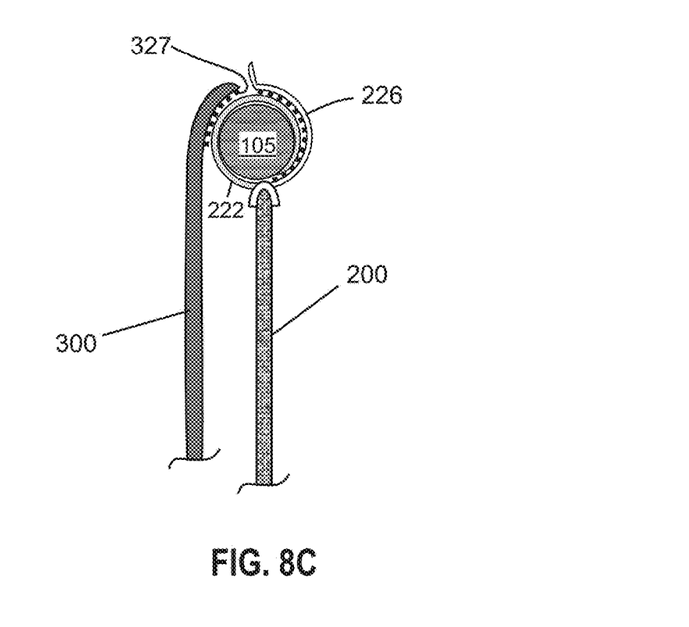
FIG. 8C is a side view of an attachment component of the storm lower attaching to the attachment component of the screen layer.

Referring to FIG. 8A, in a preferred embodiment, the length (224) of the loop material tab may be about equal to the circumference of the highway bar. The length (228) of the hook material tab may be about half the circumference of the highway bar, thus, the hook material tab (226) can overlap about half of the loop material (223) as shown in FIG. 8B. Referring to FIG. 8O, the hook material segments (327) can then attach to the remaining exposed half of the loop material (223). In another embodiment, when the solid lower (300) is attached to the screen lower (200), the solid lower (300) may be disposed between the screen lower and the front tire of the motorcycle.

Figure 1D:
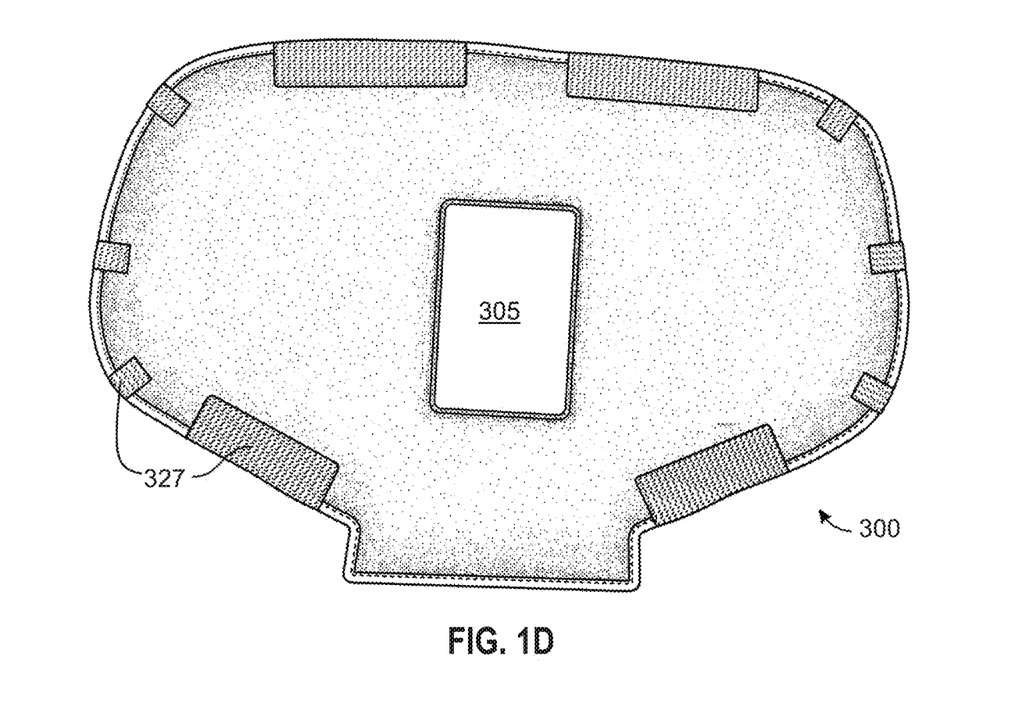
FIG. 1D shows a back view of an alternative embodiment of the storm lower having a central opening disposed therein.
Figure 1E:
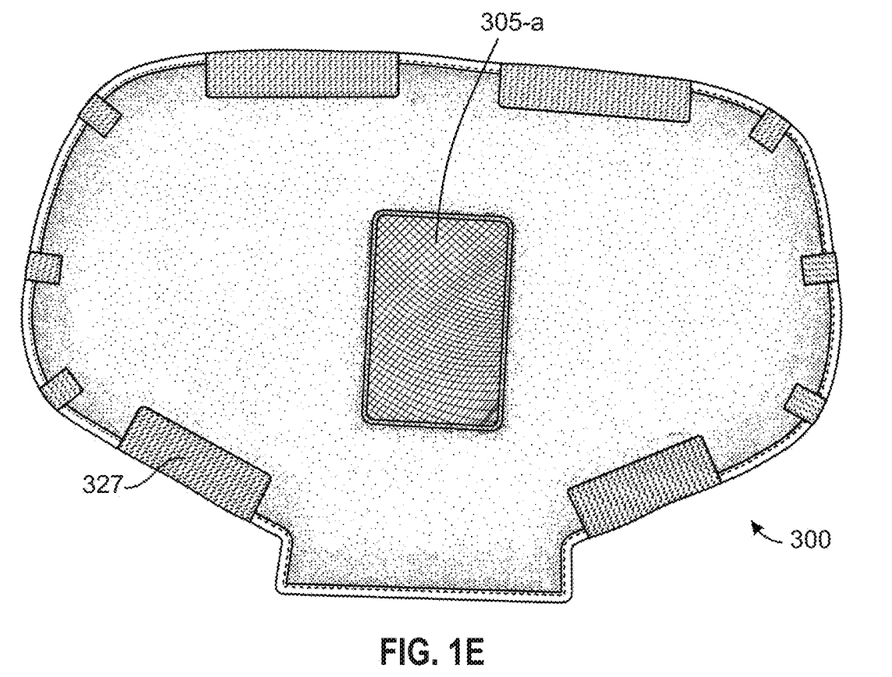
FIG. 1E shows a back view of an alternative embodiment of the storm lower having a screened central opening.
Figure 1F:
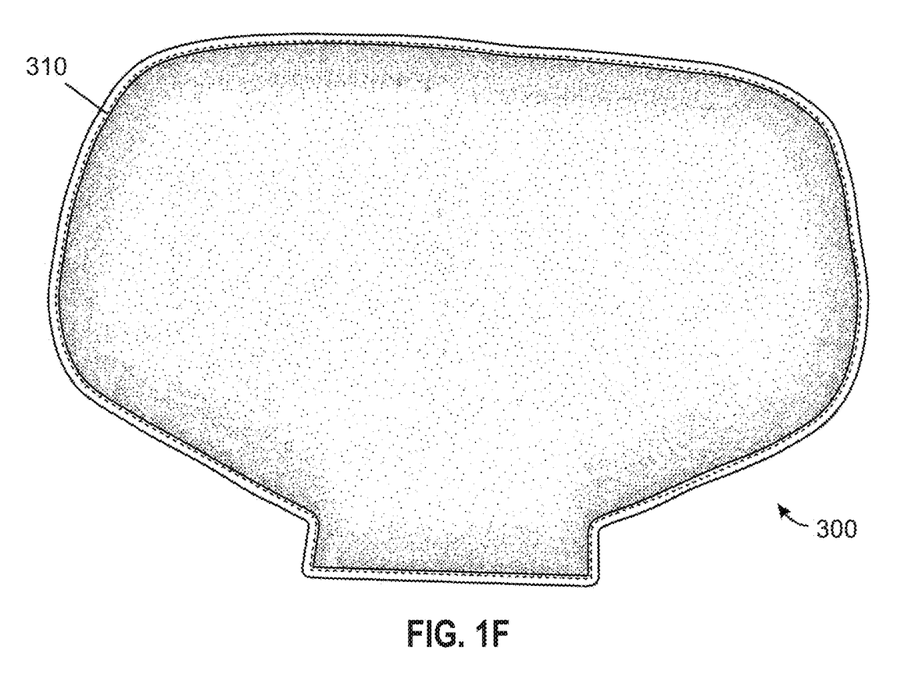
FIG. 1F is a front view of the storm lower according to the embodiment shown in FIG. 1C.
Figure 1G:
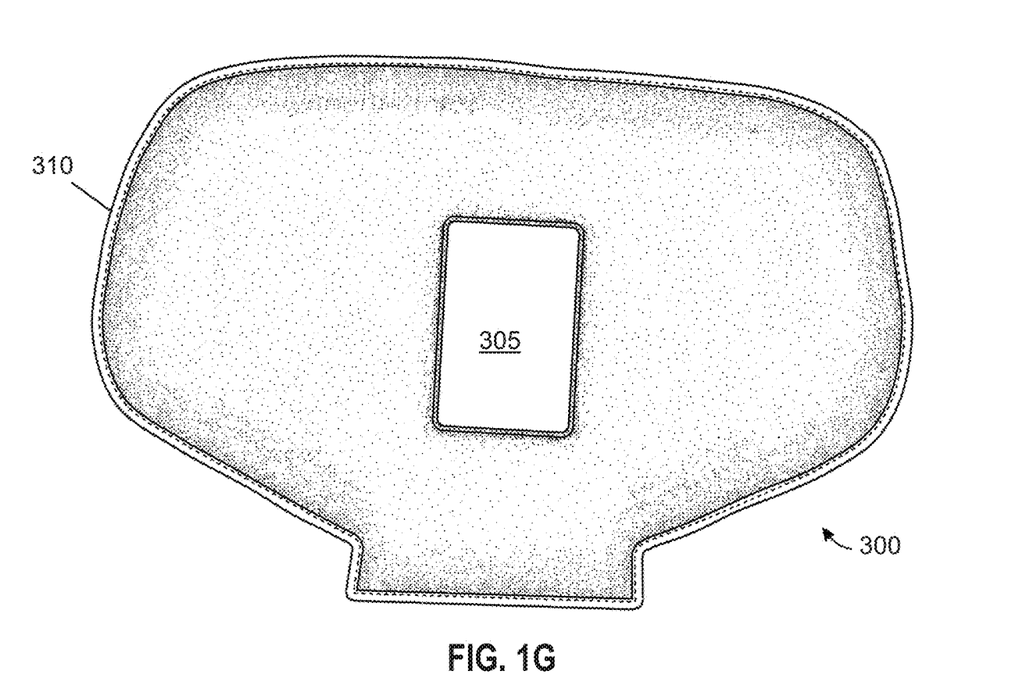
FIG. 1G is a front view of the storm lower according to the embodiment shown in FIG. 1D.
Figure 1H:
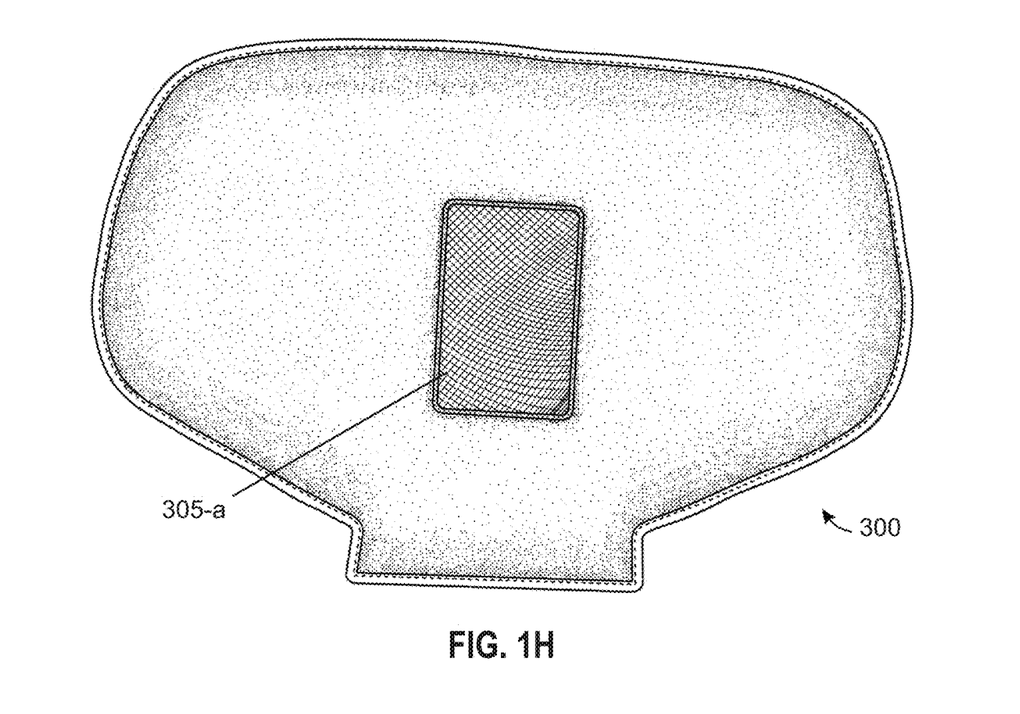
FIG. 1H is a front view of the storm lower according to the embodiment shown in FIG. 1E.

In some embodiments, as shown in FIG. 1B, the screen lower (200) may have a first window (205) centrally disposed thereon. In other embodiments, the first window (205) may be positioned on the screen lower (200) so as to provide sufficient air flow to the motorcycle engine. For example, the first window (205) may be positioned on the screen lower (200) such that the first window is directly in front of the engine. In other embodiments, as shown in FIGS. 1D and 1E, the solid lower (300) may also have a second window (305) disposed thereon. Preferably, the second window (305) may be substantially the same shape as the first window (205) of the screen lower. More preferably, the second window (305) may be disposed on the solid lower (300) so as to be aligned with the first window (205) when the solid lower (300) is secured to the screen lower (200). In further embodiments, the size of the second window (305) may be equal to or greater than the size of the first window (205). In some embodiments, the first window (205) or the second window (305) may have a length ranging from about 6 to about 15 inches. In some other embodiments, the first window (205) or the second window (305) may have a width of about 4 to about 15 inches.

Without wishing to limit the present invention to any particular size or shape, the first window (205) or second window (305) can be rectangular with sharp or curved corners, an ellipse, an oval, a trapezoid, or any other suitable polygonal shape.

As shown in FIG. 1B, the first window may be open and unobstructed. Without wishing to limit the invention, the first window may allow for increased air flow to the motorcycle engine, which can potentially reduce engine temperatures and prevent overheating. Referring now to FIG. 1D, the second window may also be an unobstructed opening. Without wishing to limit the invention, the second window may allow for increased air flow to the motorcycle engine, which can potentially reduce engine temperatures and prevent overheating. Referring to FIG. 1E, the second window may be an opening covered with a mesh screen material (305-a). Without wishing to limit the invention, the screened second window may allow for increased airflow to the engine while also protecting the engine from insects and debris.

In some embodiments, the screen lower (200) and the screened second window (305-a) may be formed from a mesh screen material. Examples of the mesh screen material may include, but is not limited to, screen materials or shade cloth similar to or identical to those used in home windows, doors, patios, and porches. Without wishing to limit the present invention to any particular material, the screen lower (200) and the screened second window (305-a) may be formed from a material commonly known as screen fabric. In some embodiments, the screen lower (200) and the screened second window (305-a) may be formed from a nylon weave with a rubberized coating, a resin mesh, or polyester canvas. As known to one of ordinary skill in the art, screen materials have a net-like or grid structure with apertures ranging from about 0.1 mm to about 1 mm. As such, the screen material may provide about 40% to about 70% coverage, defined herein as the ratio of the surface occupied by solid material to the total surface area of the screen, which depends on the size of the screen material apertures.

Without wishing to limit the present invention to any particular theory or mechanism, the screen lower (200) has the advantage of reducing the amount of bugs and/or debris that enter the motorcycle's engine, particularly via the engine's air intake. The screen lower (200) can also decrease wind pressure on the motorcycle rider's lower legs, while still allowing some air to pass into the engine's air intake and over the motorcycle rider's legs. In some embodiments, the mesh screen material can have larger or smaller sized apertures to accommodate these functions. Without wishing to limit the present invention to a particular theory or mechanism, the first window may allow additional airflow and cooling of the engine. In some embodiments, the first window is designed to have a shape and size that best facilitates airflow and engine cooling. In alternative embodiments, the screen lower (200) may comprise a continuous screen material without the first window, which allows for air flow through the screen lower and increased protection from debris.

According to some embodiments, the solid lower (300) may be comprised of a solid fabric material. In preferred embodiments, the solid lower (300) is constructed from a water-resistant fabric. For instance, the solid lower (300) may be formed from a marine grade solid fabric material. Without wishing to limit the present invention to any particular theory or mechanism, the solid lower (300) has the advantage of reducing road splash and cold air on the motorcycle rider's legs during inclement weather. In some embodiments, the second window (305) may be screened with the same material or a different material as the screen lower (200).

According to some embodiments, the present invention features methods of using the motorcycle soft lower systems (100) described herein. In one embodiment, the present invention features a method of protecting a motorcycle rider's lower legs. The method may comprise providing any one of the motorcycle soft lower systems (100) described herein, and attaching the screen lower (200) to the motorcycle highway bar (105) via the plurality of screen attachment components (220) such that the screen lower (200) covers an interior space (110) of the motorcycle highway bar (105), thus providing protection to the lower legs of the rider. In some embodiments, the step of attaching the screen lower (200) to the motorcycle highway bar (105) may comprise wrapping a loop material tab (222) around the highway bar (105) such that the loop material (223) faces outwardly, wrapping a hook material tab (226) around the highway bar such that at least a portion of the hook material (227) overlaps at least a portion of the loop material (223), securing the overlapping portion of the hook material (227) to the loop material (223), and repeating said steps for each screen attachment component (220), thereby securing the screen lower (200) to the highway bar (105).

In other embodiments, the method may further comprise providing any one of the solid lowers (300) described herein, and securing the solid lower (300) to the screen lower (200) by attaching said hook material segments (327) of the solid lower to the remaining exposed loop material (223) of the loop material tabs. In preferred embodiments, the solid lower (300) is disposed between the screen lower (200) and the front tire of the motorcycle.

EXAMPLE

The following is a non-limiting example of installing an embodiment of the motorcycle soft lower system. Equivalents or substitutes are within the scope of the invention.

Installation of Screen Lower: The screen lower may be for everyday use to buffer the wind and block bugs and road debris.

1. Separate the screen lower from the solid lower. Separate the hook and loop attachments. Work from the sides of the motorcycle.
2. Starting on one side of the motorcycle, orient the screen lower under he top of the highway bar.
3. Wrap the hook-and-loop fastener around the top bar as tightly as possible. Wrap the loop side around the bar from front to back. Attach the hook part of the fastener from bottom to top, around the back of the bar.
4. Repeat step 3 on the other side of the highway bar.
5. Repeat steps 3 and 4 on the lower angles of the highway bar, pulling the screen as tight as possible. Smooth fasteners on top and bottom to secure.
6. Secure the small tabs around the highway bar on both sides to anchor the screen and ensure the tightest fit possible.

Installation of Solid Lower: The solid lower can be used during cooler temperatures and wet rides (temperatures up to about 65° F. (13° C.)) to block cold wind and water for a more comfortable ride. Since the solid lower fits over the screen lower, the screen lower must remain attached to the highway bar.

1. Start on the one side of the motorcycle, and make sure the opening in the solid lower is centered left to right. Line up the hook-and-loop fasteners of the screen lower and solid lower on the top of the highway bar. Do this from the side of the bike, not by reaching over the front tire.
2. Starting at the top of the bar, attach the solid lower to the screen lower by pressing and smoothing the hook-and-loop fasteners together. Do this from the side of the bike, not by reaching over the front tire.
3. Repeat step 2 on the other side of the highway bar.
4. On the other side, pull the solid lower down tight on the lower angle of the highway bar and smooth together the hook-and-loop fasteners of the solid lower and screen lower on the bottom of the highway bar.
5. Repeat step 4 on the other side, keeping the solid lower as tight as possible.
6. Secure the small tabs around the highway bar on both sides so the solid lower is tight, with all hook and loop attachments aligned and smoothed.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method of protecting a motorcycle rider's lower legs, said method comprising:
   a. providing the motorcycle soft lower system (100) comprising:
      i. a screen lower (200), said screen lower (200) having a size and shape that substantially covers an interior space (110) of a motorcycle highway bar, wherein the screen lower (200) has a first window (205) centrally disposed thereon; and
      ii. a plurality of screen attachment components (220) attached to and extending from a perimeter (210) of the screen lower, wherein the screen attachment components (220) are configured to attach the screen lower (200) to the motorcycle highway bar (105),
         wherein each screen attachment component (220) comprises a loop material tab (222) and a hook material tab (226), wherein both tabs are attached to the perimeter of the screen lower such that a loop material (223) of the loop material tab faces away from the hook material tab (226), and a hook material (227) of the hook material tab faces towards the loop material tab (222),
         wherein the loop material tab (222) is configured to wrap around the highway bar (105) such that the loop material (223) faces outwardly, and the hook material tab (226) is configured to wrap around the highway bar (105) such that the hook material (227) faces and attaches to the loop material,
      wherein a length (228) of the hook material tab, which spans from the perimeter of the screen lower to an outer edge of the hook material tab, is about 25% to about 75% of a circumference of the highway bar,
      wherein a length (224) of the loop material tab, which spans from the perimeter of the screen lower to an outer edge of the loop material tab, is at least 25% longer than the length (228) of the hook material tab such that at least a portion of the hook material (227)

can overlap at least a portion of the loop material (223) when the loop material tab (222) is wrapped around the highway bar, thereby securing the screen lower (200) to the highway bar (105); and b. attaching the screen lower (200) to a motorcycle highway bar (105) via the plurality of screen attachment components (220) such that the screen lower (200) covers an interior space (110) of the motorcycle highway bar (105), comprising:
   i. wrapping a loop material tab (222) around the highway bar (105) such that the loop material (223) faces outwardly;
   ii. wrapping a hook material tab (226) around the highway bar such that at least a portion of the hook material (227) overlaps at least a portion of the loop material (223);
   iii. securing the overlapping portion of the hook material (227) to the loop material (223); and
   iv. repeating steps i. to iii. for each screen attachment component (220), thereby securing the screen lower (200) to the highway bar.

2. The method of claim 1, further comprising:
a. providing a solid lower (300) having substantially the same shape as the screen lower (200) and sufficiently sized to cover the screen lower (200), wherein a plurality of hook material segments (327) is disposed at or near a perimeter (310) of the solid lower; and
b. securing the solid lower (300) to the screen lower (200) by attaching said hook material segments (327) of the solid lower to the remaining exposed loop material (223) of the loop material tabs, wherein the solid lower (300) is disposed between the screen lower (200) and the front tire of the motorcycle.

3. The method of claim 2, wherein the solid lower (300) has a second window (305) that is substantially a same shape as the first window (205) of the screen lower, wherein the second window (305) is disposed on the solid lower (300) so as to be aligned with the first window (205) of the screen lower.

4. A motorcycle soft lower system (100) comprising:
a. a screen lower (200), said screen lower (200) having a size and shape that substantially covers an interior space (110) of a motorcycle highway bar, said screen lower (200) having a plurality of screen attachment components (220) attached to and extending from a perimeter (210) of the screen lower, wherein the screen attachment components (220) are configured to attach the screen lower (200) to the motorcycle highway bar (105); and
b. a solid lower (300) having substantially the same shape as the screen lower (200) and sufficiently sized to cover the screen lower (200), said solid lower (300) having a plurality of hook material segments (327) disposed at or near a perimeter (310) of the solid lower;
wherein each screen attachment component (220) comprises a loop material tab (222) and a hook material tab (226), wherein both tabs are attached to the perimeter of the screen lower such that a loop material (223) of the loop material tab faces away from the hook material tab (226), and a hook material (227) of the hook material tab faces towards the loop material tab (222),
wherein the loop material tab (222) is configured to wrap around the highway bar (105) such that the loop material (223) faces outwardly, and the hook material tab (226) is configured to wrap around the highway bar (105) such that the hook material (227) faces towards the loop material (223),
wherein a length (228) of the hook material tab, which spans from the perimeter of the screen lower to an outer edge of the hook material tab, is about 25% to about 75% of a circumference of the highway bar,
wherein a length (224) of the loop material tab, which spans from the perimeter of the screen lower to an outer edge of the loop material tab, is at least 25% longer than the length (228) of the hook material tab such that at least a portion of the hook material (227) can overlap at least a portion of the loop material (223) when the loop material tab (222) is wrapped around the highway bar, thereby securing the screen lower (200) to the highway bar (105),
wherein the solid lower (300) is configured to be secured to the screen lower (200) by attaching said hook material segments (327) to the remaining exposed loop material (223) of the loop material tabs.

5. A motorcycle soft lower system (100) comprising:
a. a screen lower (200), said screen lower (200) having a size and shape that substantially covers an interior space (110) of a motorcycle highway bar (105); and
b. a plurality of screen attachment components (220) attached to and extending from a perimeter (210) of the screen lower, wherein the screen attachment components (220) are configured to attach the screen lower (200) to the motorcycle highway bar (105);
wherein each screen attachment component (220) comprises a loop material tab (222) and a hook material tab (226), wherein both tabs are attached to the perimeter of the screen lower such that a loop material (223) of the loop material tab faces away from the hook material tab (226), and a hook material (227) of the hook material tab faces towards the loop material tab (222),
wherein the loop material tab (222) is configured to wrap around the highway bar (105) such that the loop material (223) faces outwardly, and the hook material tab (226) is configured to wrap around the highway bar (105) such that the hook material (227) faces towards the loop material (223),
wherein a length (228) of the hook material tab, which spans from the perimeter of the screen lower to an outer edge of the hook material tab, is about 25% to about 75% of a circumference of the highway bar,
wherein a length (224) of the loop material tab, which spans from the perimeter of the screen lower to an outer edge of the loop material tab, is at least 25% longer than the length (228) of the hook material tab such that at least a portion of the hook material (227) can overlap at least a portion of the loop material (223) when the loop material tab (222) is wrapped around the highway bar, thereby securing the screen lower (200) to the highway bar (105).

6. The system (100) of claim 5 further comprising a solid lower (300) having substantially the same shape as the screen lower (200) and sufficiently sized to cover the screen lower (200).

7. The system (100) of claim 6, wherein the solid lower (300) has a plurality of hook material segments (327) disposed at or near a perimeter (310) of the solid lower, wherein the solid lower (300) is configured to be secured to the screen lower (200) by attaching said hook material segments (327) to the remaining exposed loop material (223) of the loop material tabs.

* * * * *